United States Patent
Kariyada

(10) Patent No.: US 7,859,984 B2
(45) Date of Patent: Dec. 28, 2010

(54) OPTICAL INFORMATION RECORDING MEDIUM

(75) Inventor: Eiji Kariyada, Tokyo (JP)

(73) Assignee: NEC Corporation, Tokyo (JP)

( * ) Notice: Subject to any disclaimer, the term of this patent is extended or adjusted under 35 U.S.C. 154(b) by 745 days.

(21) Appl. No.: 11/860,566

(22) Filed: Sep. 25, 2007

(65) Prior Publication Data

US 2008/0074989 A1 Mar. 27, 2008

(30) Foreign Application Priority Data

Sep. 26, 2006 (JP) .............................. 2006-260507

(51) Int. Cl.
G11B 7/254 (2006.01)

(52) U.S. Cl. ..................................... 369/286

(58) Field of Classification Search .................. 369/286
See application file for complete search history.

(56) References Cited

U.S. PATENT DOCUMENTS 7,623,434 B2 * 11/2009 Kimura et al. ......... 369/112.08
2006/0092815 A1 * 5/2006 Kimura et al. ......... 369/112.08

FOREIGN PATENT DOCUMENTS

| JP | 2002-92950 | 3/2002 |
|---|---|---|
| JP | 2002-144736 | 5/2002 |
| JP | 2003-94819 | 4/2003 |
| JP | 2005-302264 | 10/2005 |

* cited by examiner

Primary Examiner—Mark Blouin
(74) Attorney, Agent, or Firm—Young & Thompson

(57) ABSTRACT

An optical information recording medium includes a dielectric layer and an Ag-based reflection layer or an Ag-based metal semitransparent layer adjacent to the dielectric layer. The dielectric layer contains niobium oxide between 50 mol % and 75 mol %, zinc sulfide between 10 mol % and 30 mol %. The dielectric layer further contains an additive which is at least one of or a mixture of at least two of the following materials: aluminum oxide, tantalum oxide, silicon oxide, cerium oxide, yttrium oxide, hafnium oxide and bismuth oxide. By this structure layers, an Ag-based reflection layer or Ag-based metal semitransparent layer can apply to a phase-change optical disc without requiring a layer for preventing the Ag-based layer from sulfurization. An optical information recording medium having high productivity can be provided.

17 Claims, 10 Drawing Sheets

- 7: METAL REFLECTION LAYER
- 6: SECOND DIELECTRIC LAYER
- 5: SECOND INTERFACE LAYER
- 4: RECORDING LAYER
- 3: FIRST INTERFACE LAYER
- 2: FIRST DIELECTRIC LAYER
- 1: TRANSPARENT SUBSTRATE

Fig. 4

NbO$_x$(Pmol%)−ZnS(Qmol%)−Ta$_2$O$_5$(Rmol%)

| No | P | Q | R | REPEAT COUNT OF O/W | CORROSION | SPECIFIC RESISTANCE (Ω cm) | ABNORMAL ELECTRIC DISCHARGE |
|---|---|---|---|---|---|---|---|
| 1 | 50 | 5 | 45 | 6000 | NOT OBSERVED | 4.3E−3 | NOT OBSERVED |
| 2 | 50 | 10 | 40 | 10000 | NOT OBSERVED | 1.0E−3 | NOT OBSERVED |
| 3 | 50 | 15 | 35 | 10000 | NOT OBSERVED | 2.3E−2 | NOT OBSERVED |
| 4 | 50 | 20 | 30 | 10000 | NOT OBSERVED | 8.5E−2 | NOT OBSERVED |
| 5 | 50 | 25 | 25 | 10000 | NOT OBSERVED | 8.7E−2 | NOT OBSERVED |
| 6 | 50 | 30 | 20 | 10000 | NOT OBSERVED | 9.0E−2 | NOT OBSERVED |
| 7 | 50 | 35 | 15 | 7000 | OBSERVED | 5.3E+1 | OBSERVED |
| 8 | 50 | 40 | 10 | 5000 | OBSERVED | 7.6E+2 | OBSERVED |
| 9 | ZnS−SiO$_2$ | | | 500 | OBSERVED | OUT OF MEASUREMENT (∞) | OBSERVED |

Fig. 5

$NbO_x$(Pmol%)–ZnS(Qmol%)–$Al_2O_3$(Rmol%)

| No | P | Q | R | REPEAT COUNT OF O/W | CORROSION | SPECIFIC RESISTANCE ($\Omega$ cm) | ABNORMAL ELECTRIC DISCHARGE |
|---|---|---|---|---|---|---|---|
| 1 | 60 | 5 | 35 | 6000 | NOT OBSERVED | 5.6E−4 | NOT OBSERVED |
| 2 | 60 | 10 | 30 | 10000 | NOT OBSERVED | 3.4E−3 | NOT OBSERVED |
| 3 | 60 | 15 | 25 | 10000 | NOT OBSERVED | 7.9E−2 | NOT OBSERVED |
| 4 | 60 | 20 | 20 | 10000 | NOT OBSERVED | 6.8E−2 | NOT OBSERVED |
| 5 | 60 | 25 | 15 | 10000 | NOT OBSERVED | 7.5E−2 | NOT OBSERVED |
| 6 | 60 | 30 | 10 | 10000 | NOT OBSERVED | 8.6E−2 | NOT OBSERVED |
| 7 | 60 | 35 | 5 | 5000 | OBSERVED | 2.3E+1 | OBSERVED |
| 8 | 60 | 40 | 0 | 1000 | OBSERVED | 8.9E+1 | OBSERVED |
| 9 | $ZnS-SiO_2$ | | | 500 | OBSERVED | OUT OF MEASUREMENT ($\infty$) | OBSERVED |

Fig. 6

$NbO_x$ (Pmol%) – ZnS (Qmol%) – $Al_2O_3$ (Rmol%)

| No | P | Q | R | REPEAT COUNT OF O/W | CORROSION | SPECIFIC RESISTANCE (Ωcm) | ABNORMAL ELECTRIC DISCHARGE |
|---|---|---|---|---|---|---|---|
| 1 | 40 | 20 | 40 | 3000 | NOT OBSERVED | 4.3E+2 | OBSERVED |
| 2 | 45 | 20 | 35 | 10000 | NOT OBSERVED | 1.3E+0 | OBSERVED |
| 3 | 50 | 20 | 30 | 10000 | NOT OBSERVED | 7.9E-2 | NOT OBSERVED |
| 4 | 60 | 20 | 20 | 10000 | NOT OBSERVED | 6.8E-2 | NOT OBSERVED |
| 5 | 65 | 20 | 15 | 10000 | NOT OBSERVED | 7.8E-2 | NOT OBSERVED |
| 6 | 70 | 20 | 10 | 10000 | NOT OBSERVED | 9.4E-2 | NOT OBSERVED |
| 7 | 75 | 20 | 5 | 10000 | NOT OBSERVED | 1.2E-3 | NOT OBSERVED |
| 8 | 78 | 20 | 2 | 7500 | NOT OBSERVED | 8.9E-3 | NOT OBSERVED |
| 9 | $ZnS-SiO_2$ | | | 500 | OBSERVED | OUT OF MEASUREMENT (∞) | OBSERVED |

Fig. 7

NbOx (Pmol%)–ZnS (Qmol%)–{(Al$_2$O$_3$)$_y$(Ta$_2$O$_5$)$_{(1-y)}$} (Rmol%)

| No | P | Q | R | REPEAT COUNT OF O/W | CORROSION | SPECIFIC RESISTANCE (Ωcm) | ABNORMAL ELECTRIC DISCHARGE |
|---|---|---|---|---|---|---|---|
| 1 | 55 | 5 | 40 | 3000 | NOT OBSERVED | 1.3E−3 | NOT OBSERVED |
| 2 | 55 | 10 | 35 | 10000 | NOT OBSERVED | 9.6E−2 | NOT OBSERVED |
| 3 | 55 | 15 | 30 | 10000 | NOT OBSERVED | 7.5E−2 | NOT OBSERVED |
| 4 | 55 | 20 | 25 | 10000 | NOT OBSERVED | 7.3E−2 | NOT OBSERVED |
| 5 | 55 | 25 | 20 | 10000 | NOT OBSERVED | 5.6E−2 | NOT OBSERVED |
| 6 | 55 | 30 | 15 | 10000 | NOT OBSERVED | 1.7E−1 | NOT OBSERVED |
| 7 | 55 | 35 | 10 | 10000 | OBSERVED | 1.2E+1 | OBSERVED |
| 8 | 55 | 40 | 5 | 7500 | OBSERVED | 3.6E+1 | OBSERVED |
| 9 | ZnS–SiO$_2$ | | | 500 | OBSERVED | OUT OF MEASUREMENT (∞) | OBSERVED |

Fig. 9

| COMPOSITION OF FILM | FILM FORMATION METHOD | FILM FORMING SPEED (nm/sec) |
|---|---|---|
| $NbO_x$ (60mol%) – ZnS (20mol%) – $Al_2O_3$ (20mol%) | PULSE DC SPUTTER | 0.93 |
| ZnS (80mol%) – $SiO_2$ (20mol%) | RF SPUTTER | 1.02 |

Fig. 10

NbO$_x$ (Pmol%) -ZnS (Qmol%) -Al$_2$O$_3$ (Rmol%)

| No | P | Q | R | REPEAT COUNT OF O/W | CORROSION | SPECIFIC RESISTANCE (Ωcm) | ABNORMAL ELECTRIC DISCHARGE |
|---|---|---|---|---|---|---|---|
| 1 | 40 | 20 | 40 | 1500 | NOT OBSERVED | 4.3E+2 | OBSERVED |
| 2 | 45 | 20 | 35 | 10000 | NOT OBSERVED | 1.4E+0 | OBSERVED |
| 3 | 50 | 20 | 30 | 10000 | NOT OBSERVED | 7.9E-2 | NOT OBSERVED |
| 4 | 60 | 20 | 20 | 10000 | NOT OBSERVED | 6.8E-2 | NOT OBSERVED |
| 5 | 65 | 20 | 15 | 10000 | NOT OBSERVED | 7.8E-2 | NOT OBSERVED |
| 6 | 70 | 20 | 10 | 10000 | NOT OBSERVED | 9.4E-2 | NOT OBSERVED |
| 7 | 75 | 20 | 5 | 10000 | NOT OBSERVED | 1.2E-3 | NOT OBSERVED |
| 8 | 78 | 20 | 2 | 3000 | NOT OBSERVED | 8.9E-3 | NOT OBSERVED |
| 9 | ZnS-SiO$_2$ | | | 100 | OBSERVED | OUT OF MEASUREMENT (∞) | OBSERVED |

OPTICAL INFORMATION RECORDING MEDIUM

BACKGROUND OF THE INVENTION

1. Field of the Invention

The present invention relates to an optical information recording medium, and more particularly relates to an optical information recording medium in which a reflection layer and a dielectric layer are adjacent to each other.

2. Description of Related Art

In Japanese Laid-Open Patent Application (JP-P2002-92950A), an invention related to an optical information recording medium and a method of manufacturing the same is disclosed. This optical information recording medium is a phase change type, which has at least a first dielectric layer, a recording layer, a second dielectric layer and a reflection layer on a transparent substrate and in which those layers are sequentially laminated. Here, at least one of the layers including the surface where the first dielectric layer and the second dielectric layer are in contact with the recording layer is the layer made of a compound which does not include an IVb group element except carbon, or a dielectric material constituted by a mixture of the compound and zinc sulfide.

In Japanese Laid-Open Patent Application (JP-P2002-144736A), an information recording medium, a method of manufacturing the same, and a method of recording and reproducing the same are disclosed. According to this document, the information recording medium has a first information layer and a second information layer. The first information layer includes a first recording layer in which a reversible phase change is generated between a crystal phase and an amorphous phase by an emission of a laser beam or by a joule heat that is generated by an application of an electric current. The second information layer includes a second recording layer in which a reversible phase change is generated between a crystal phase and an amorphous phase by an emission of the laser beam or by a joule heat that is generated by an application of the current. The first recording layer is made of a first material, and the second recording layer is made of a second material, and the first material and the second material are different from each other.

In Japanese Laid-Open Patent Application (JP-P2003-94819A), an optical recording medium and a sputtering target for the optical recording medium are disclosed. This optical recording medium has at least a phase change type recording layer on a disc-shaped substrate. The recording layer is represented by a composition formula of $X\alpha Y\beta Z\gamma Sb\delta Te\epsilon$ (X indicates Si and/or Ge, Y indicates Ag and/or Bi, and Z indicates Ga and/or In). The respective composition ratios (at %) satisfy the following relations.

$\alpha+\beta+\gamma+\delta+\epsilon \geq 98$ $0.5 \leq \alpha \leq 5$ $0.1 \leq \beta \leq 5$ $1 \leq \gamma \leq 10$ $65 \leq \delta \leq 80$ $15 \leq \epsilon \leq 25$ In Japanese Laid-Open Patent Application (JP-P2005-302264A), an invention related to a phase change type optical information recording medium and a two-layer phase change type optical information recording medium are disclosed. In this optical information recording medium, a first dielectric layer, a phase change type recording layer, a second dielectric layer and a reflection layer are sequentially laminated on a transparent first substrate. The phase change type recording layer is constituted by a thin film having a film thickness between 5 and 16 nm, in which the main component is the alloy represented by the composition formula of $Ge_xSb_yTe_z$ (x, y and z are assumed to be $3.5 \leq x \leq 10$, $70 \leq y \leq 80$ and $z=100-x-y$, when they are indicated by atomic %). The second dielectric layer is constituted by a thin film having a film thickness between 10 and 30 nm in which the main component is a mixed oxide of $Nb_2O_5$ and $ZrO_2$ and/or ZnO.

SUMMARY

An exemplary object of the present invention is to provide an optical information recording medium, which has a dielectric layer that is not sulfurized even if a reflection layer or a semi-transparent layer whose main component is Ag is adjacent to, and an abnormal electric discharging is not generated in an RF sputtering method applied at a time of film formation.

Another exemplary object of the present invention is to provide a method of manufacturing an optical information recording medium, which has a dielectric layer that is not sulfurized even if a reflection layer or a semi-transparent layer whose main component is Ag is adjacent to, and the abnormal electric discharging is not generated in the RF sputtering method at a time of the film formation.

According to an exemplary aspect of the invention, an optical information recording medium includes: a recording layer on which information is recorded by changing an optical property of the recording layer by an irradiation of a laser light; a reflection layer configured to reflect the laser light; and an upper side dielectric layer configured to cover the recording layer from a side of the reflection layer. The upper side dielectric layer contains niobium oxide and zinc sulfide. A a mol ratio P of the niobium oxide to the upper side dielectric layer satisfies 50 mol % $\leq P \leq$ 75 mol %. A mol ratio Q of the zinc oxide to the upper side dielectric layer satisfied 10 mol % $\leq Q \leq$ 30 mol %.

According to another exemplary aspect of the invention, an optical information recording medium includes a plurality of optical information recording layers. Each of the plurality of optical information recording layers includes: a recording layer on which information is recorded by changing an optical property of the recording layer by an irradiation of a laser light; a reflecting or semitransparent layer configured to reflect the laser light or to be semitransparent to the laser light; and an upper side dielectric layer configured to cover the recording layer from a side of the reflecting or semitransparent layer. The upper side dielectric layer contains niobium oxide and zinc sulfide. A mol ratio P of the niobium oxide to the upper side dielectric layer satisfies 50 mol % $\leq P \leq$ 75 mol %. A mol ratio Q of the zinc oxide to the upper side dielectric layer satisfied 10 mol % $\leq Q \leq$ 30 mol %.

According to further another exemplary aspect of the invention, an optical information recording layer includes: a recording layer on which information is recorded by changing an optical property of the recording layer by an irradiation of a laser light; a reflecting or semitransparent layer configured to reflect the laser light or to be semitransparent to the laser light; and an upper side dielectric layer configured to cover the recording layer from a side of the reflecting or semitransparent layer. The upper side dielectric layer contains niobium oxide and zinc sulfide. A mol ratio P of the niobium oxide to the upper side dielectric layer satisfies 50 mol % ≦ P ≦ 75 mol %. A mol ratio Q of the zinc oxide to the upper side dielectric layer satisfied 10 mol % ≦ Q ≦ 30 mol %.

According to further another exemplary aspect of the invention, a dielectric material includes: a niobium oxide; and a zinc sulfide. A mol ratio P of the niobium oxide satisfies 50 mol % ≦ P ≦ 75 mol %. A mol ratio Q of the zinc oxide satisfied 10 mol % ≦ Q ≦ 30 mol %.

According to further another exemplary aspect of the invention, a target, used in a sputtering to form a dielectric film, includes: a niobium oxide; and a zinc sulfide. A mol ratio P of the niobium oxide satisfies 50 mol % ≦ P ≦ 75 mol %. A mol ratio Q of the zinc oxide satisfied 10 mol % ≦ Q ≦ 30 mol %.

According to further another exemplary aspect of the invention, A manufacturing method of an optical information recording medium includes: (a) manufacturing a recording layer on which information is recorded by changing an optical property of the recording layer by an irradiation of a laser light; (b) forming a reflection layer including Ag as a primary constituent and configured to reflect the laser light; and (c) forming an upper side dielectric layer configured to cover the recording layer from a side of the reflection layer by sputtering method. A target used in the sputtering method performed in the (c) forming to form the dielectric layer includes: niobium oxide; zinc sulfide; and an additive being at least one of or a mixture of at least two of materials selected from the group consisting of an aluminum oxide, tantalum oxide, silicon oxide, cerium oxide, yttrium oxide, hafnium oxide and bismuth oxide. A mol ratio P of the niobium oxide to the target satisfies 50 mol % ≦ P ≦ 75 mol %. A mol ratio Q of the zinc oxide to the target side dielectric layer satisfied 10 mol % ≦ Q ≦ 30 mol %. A mol ratio R of the additive to the target satisfies a condition P+Q+R ≧ 99 mol %.

Even if the dielectric layer based on the present invention is adjacent to, a reflection layer or a semi-transparent layer whose main component is Ag is not sulfurized. That is, the sulfurization protection layer or barrier layer required in related arts is not required to be formed between the reflection layer or semi-transparent layer and the dielectric layer.

Thus, it is possible to provide an optical information recording medium, which is excellent in mass productivity, highly flexible in designing and excellent in quality.

BRIEF DESCRIPTION OF THE DRAWINGS

FIG. 4 is a table showing a composition of a second dielectric layer and its test result;

FIG. 5 is a table showing a composition of a second dielectric layer and its test result;

FIG. 6 is a table showing a composition of a second dielectric layer and its test result;

FIG. 7 is a table showing a composition of a second dielectric layer and its test result;

FIG. 9 is a table showing a comparison between film formation speeds in different sputtering methods; and FIG. 10 is a table showing a composition of a second dielectric layer and its test result.

DETAILED DESCRIPTION OF PREFERRED EMBODIMENTS

The best mode of carrying out the optical information recording medium according to the present invention will be described below with reference to the accompanying drawings.

First Embodiment

Figure 1:
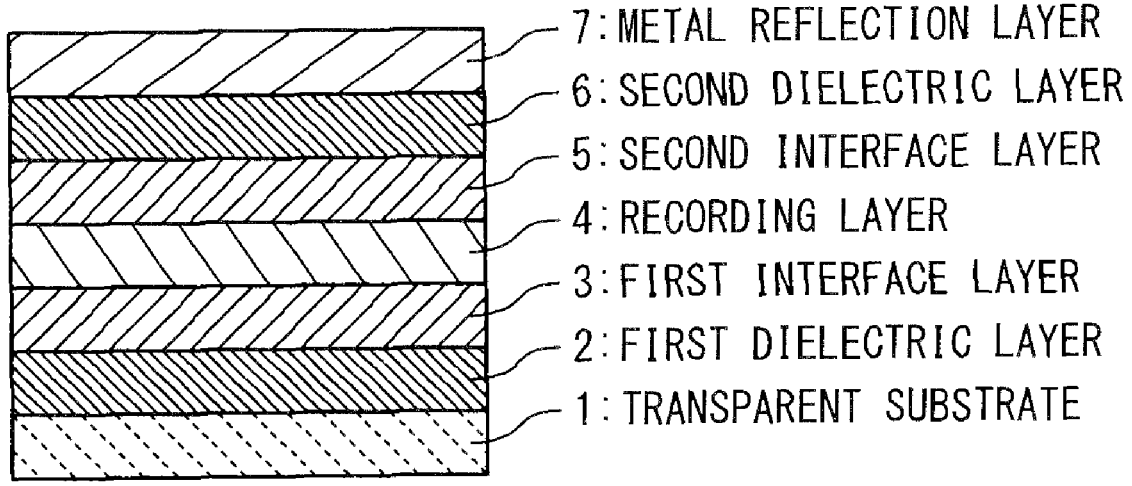
FIG. 1 is a sectional view showing an optical disc according to a first embodiment of the present invention.

A first exemplary embodiment of the present invention will be described below with reference to the accompanying drawings. FIG. 1 is a sectional view showing the optical disc serving as the optical information recording medium according to this embodiment. This optical disc is a rewritable phase change type exemplified by DVD-RW (Digital Versatile Disc ReWritable). As shown in FIG. 1, the optical disc according to this embodiment includes a transparent substrate 1. A first dielectric layer 2, a first interface layer 3, a recording layer 4, a second interface layer 5, a second dielectric layer 6 and a metal reflection layer 7 are laminated in this order on this transparent substrate 1.

As a material for forming the recording layer 4, typical record materials such as GeSbTe, AgInSbTe and the like can be used. As a material for forming the reflection layer 7, a material whose main constituent is Ag is preferably used from a viewpoint of the compatibility between a high thermal conductivity and a high transmittance. In order to improve an environment resistance of the Ag reflection film, the elements of Pd, Cu, Ge, In, Nd and the like may be properly added.

As the first dielectric layer 2, ZnS—SiO$_2$ is typically used. However, other materials disclosed in embodiments of a present invention used as a dielectric layer may be used. As for the composition of ZnS—SiO$_2$, the range of 0.5 ≦ x ≦ 0.9 in the composition representation of (ZnS)$_x$(SiO$_2$)$_{(1-x)}$ is preferable from a viewpoint of desirable refractive index and productivity.

An interface layer may be added between the first dielectric layer 2 or second dielectric layer 6 and the recording layer 4. The interface layer is added in order to improve the crystallizing speed of the recording layer and improve the number of rewritable repeat count. Then, GeN, SiC, SiN and the like are used.

When the ZnS—SiO$_2$ is used as the second dielectric layer 6, the sulfurization protection layer made of Sic, Sin, GeN and the like is added between the Ag reflection layer and the second dielectric layer 6 in some arts related to this technical field.

The inventor of the present invention experimentally discovered that, when dielectric substances of embodiments of a present invention explained below is adopted as the second dielectric layer 6, the sulfurization of the Ag-based metal reflection layer 7 can be avoided and the possible repetition number of recording and reproducing operation can be greatly increased as compared with the case using the ZnS—SiO$_2$.

That is, the dielectric substance of the present invention includes niobium oxide of P mol %, zinc sulfide of Q mol % and second oxide of R mol %, instead of the ZnS—SiO$_2$. Here, the second oxide is the oxide constituted by at least one type of oxide, which is selected from an aluminum oxide, a tantalum oxide, a silicon oxide, a cerium oxide, an yttrium oxide, a hafnium oxide and a bismuth oxide, or an oxide constituted by a plurality of mixtures of them.

A film of any of those oxides are formed by using the sputtering method, which uses the target having the composition that satisfies 50 ≦ P ≦ 75, 10 ≦ Q ≦ 30 and P+Q+R ≧ 99.

On the other hand, it is discovered that a target having the composition in which the content of the niobium oxide was 50 mol % or less and the content of the zinc sulfide was 30 mol % or more should not be used in the second dielectric layer 6. This is because the possible repetition number of recording and reproducing operation is sensitively deteriorated and the film formation based on a pulse DC sputtering method can not be stably executed.

Second Embodiment

Figure 2:
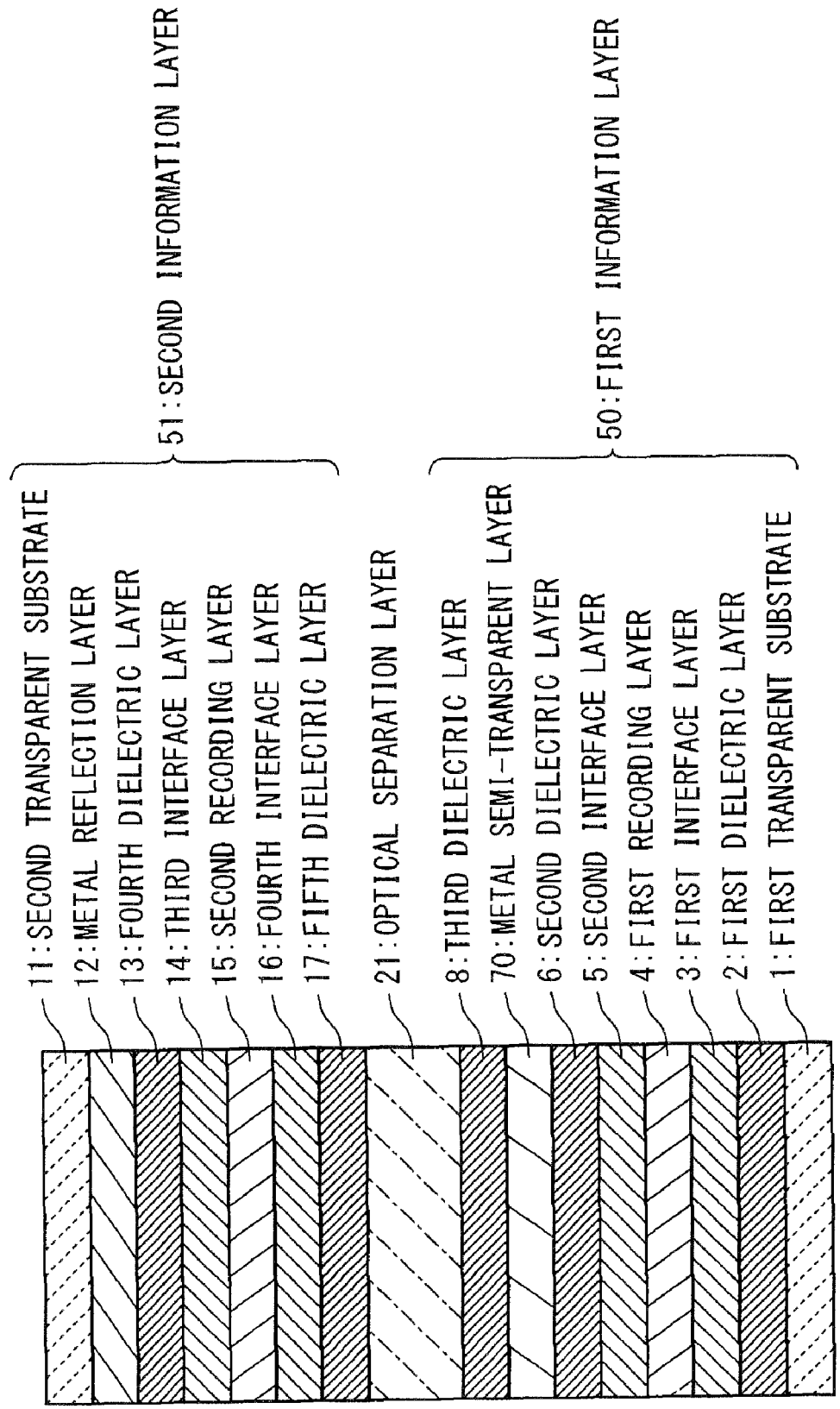
FIG. 2 is a sectional view showing an optical disc (type A) according to a second embodiment of the present invention.

A second exemplary embodiment of a present invention will be described below with reference to the accompanying drawings. FIG. 2 is a sectional view showing the optical disc of the optical information recording medium according to this embodiment. As shown in FIG. 2, the optical disc according to this embodiment includes a first transparent substrate 1. A first dielectric layer 2, a first interface layer 3, a first recording layer 4, a second interface layer 5, a second dielectric layer 6, a metal semi-transparent layer 70 and a third dielectric layer 8 are sequentially laminated in this order, on the first transparent substrate 1. Here, they are collectively referred to as "First Information Layer 50".

An optical separation layer 21 is formed on the first information layer 50. Moreover, a second information layer 51 is arranged thereon. As for the second information layer 51, similarly to the first information layer 50, a metal reflection layer 12, a fourth dielectric layer 13, a third interface layer 14, a second recording layer 15, a fourth interface layer 16 and a fifth dielectric layer 17 are sequentially laminated in this order, on a second transparent substrate 11.

The first information layer 50 and the second information layer 51 are laminated on the different transparent substrates, respectively, and finally stuck through the optical separation layer 21 made of ultraviolet light curing resin to each other to form the optical information recording medium having the two-layer information layer. In the optical information recording medium manufactured by this method, the laser light for recording or reproducing information is inputted from the first information layer side. Here, this type of the optical information recording medium is referred to as "Type A of Optical Information Recording Medium".

Figure 3:
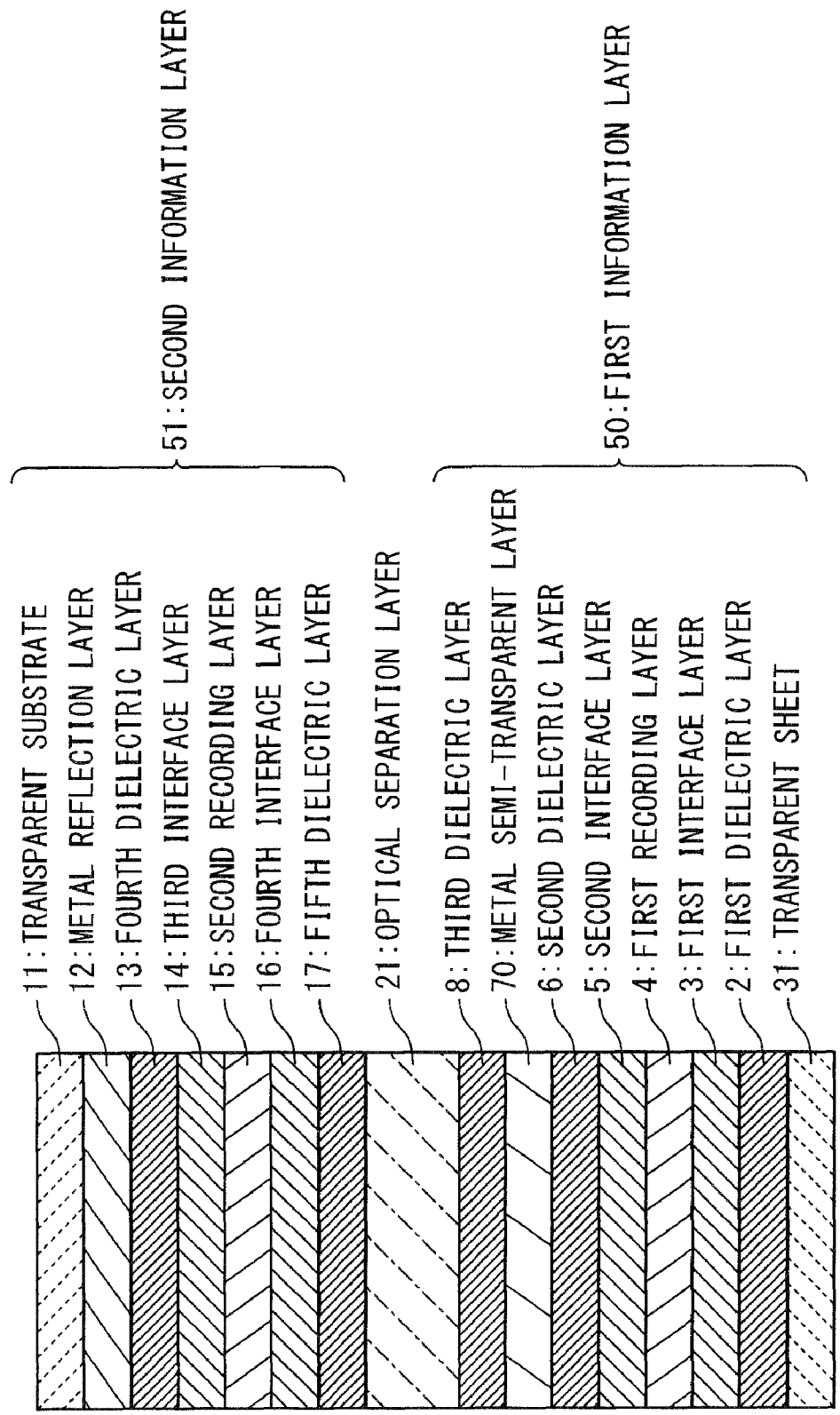
FIG. 3 is a sectional view showing an optical disc (type B) according to a second embodiment of the present invention.

FIG. 3 shows a structure of another type of the optical information recording medium in a second embodiment. The metal reflection layer 12, the fourth dielectric layer 13, the third interface layer 14, the second recording layer 15, the fourth interface layer 16 and the fifth dielectric layer 17 are sequentially laminated in this order as the second information layer 51 on the first transparent substrate 11. Then, the optical separation layer 21 made of ultraviolet light curing resin is formed. At this manufacturing step, the guide groove (not shown) which is constituted by a land and a groove is formed on the optical separation layer, at the same time. Thereon, the third dielectric layer 8, the metal semi-transparent layer 70, the second dielectric layer 6, the second interface layer 5, the recording layer 4, the first interface layer 3 and the first dielectric layer 2 are laminated in this order as the first information layer 50. Finally, the ultraviolet light curing resin is used to bond a transparent sheet 31 having a thickness of about 100 μm.

In this type of the optical information recording medium, a laser light for recording or reproducing information is inputted through the thin transparent sheet 31 from the first information layer side. Hereafter, this type of the optical information recording medium is referred to as "Type B of Optical Information Recording Medium".

In both of the types A, B of the optical information recording media, a laser light is inputted from the first information layer side. Thus, even the manufacturing order of the layers of the types A, B of the optical information recording media are different, the arrangements of the first information layers thereof when they are viewed from the laser light source are same. Hereafter, the first information layer of the type A of the optical information recording medium is representatively explained.

As the first recording layer 4 shown in FIG. 2, typical recording materials such as GeSbTe, AgInSbTe and the like may be used. As the metal semi-transparent layer 70, a material whose main constituent is Ag is preferably used from the viewpoint of the compatibility between the high thermal conductivity and the high transmittance. The elements of Pd, Cu, Ge, In, Nd and the like may be added to the metal semi-transparent layer 70, in order to improve the environment resistance.

As the first dielectric layer 2, the $ZnS-SiO_2$ is typically used. However, the dielectric layer disclosed in embodiments of a present invention may be used. The composition of the $ZnS-SiO_2$ is preferred to belong to the range of $0.5 \leq x \leq 0.9$ with respect to the composition representation of $(ZnS)_x(SiO_2)_{(1-x)}$ from the viewpoint of a desirable refractive index and productivity. The interface layers 3, 5 can be added between the first dielectric layer 2 or second dielectric layer 6 and the recording layer 4 respectively. The interface layers 3, 5 are added in order to improve the crystallizing speed and the possible repetition number of rewriting. The material such as GeN, SiC, SiN and the like are used for the interface layers.

The inventor of the present invention formed the dielectric layer, by using a sputtering method that uses a target having a composition which satisfies the following condition, instead of the $ZnS-SiO_2$ as the second dielectric layer 6. That is, this target includes the niobium oxide of P mol %, the zinc sulfide of Q mol % and the second oxide of R mol %. Here, the second oxide is the oxide constituted by at least one oxide, which is selected from the aluminum oxide, the tantalum oxide, the silicon oxide, the cerium oxide, the yttrium oxide, the hafnium oxide and the bismuth oxide, or an oxide being mixture of these oxides. The P, Q and R satisfy $50 \leq P \leq 75$, $10 \leq Q \leq 30$ and $P+Q+R \geq 99$. Similarly, the third dielectric layer 8 is formed by a sputtering method that uses a target similar to the second dielectric layer 6.

The Ag-based semi-transparent layer is sulfurized when the $ZnS-SiO_2$ used as the dielectric layer in some related techniques is adjacent to. In order to prevent the sulfurization, the sulfurization protection layer, such as Sic, SiN, GeN and the like are arranged between the Ag-based semi-transparent layer and the dielectric layer in some related techniques. However, when the dielectric layers 6, 8 based on the configuration of a present embodiment are used, even if they are adjacent to the Ag-based metal semi-transparent layer 70, the sulfurization of Ag can be prevented. Moreover, the inventor confirmed experimentally the fact that the possible repetition number of recording and reproducing operation can be greatly increased as compared with the case that the $ZnS-SiO_2$ is used.

By considering the unavoidable mixing of material components other than desirable component in the formation of the target, the condition $P+Q+R \geq 99$ is set in first and second embodiments. Here, as the material components being mixed are, for example, a crucible used to form the target, and the like. The degree of mixed impurities is 1 mol % or less, in usual target forming cases.

(First Implementation)

A first implementation according to a first embodiment of a present invention will be described below. The first dielectric layer 2, the first interface layer 3, the recording layer 4, the second interface layer 5, the second dielectric layer 6 and the metal reflection layer 7 were sequentially laminated in this order, on the first transparent substrate 1. The optical discs were formed by variously changing the film composition of the second dielectric layer 6. As the first dielectric layer 2, ZnS—SiO$_2$ film having a thickness of 50 nm was formed. As the recording layer 4, GeSbTe film having a thickness of 12 nm was formed. As the first interface layer 3 and the second interface layer 5, GeN films were formed. As the metal reflection layer 7, AgPdCu layer was formed.

After forming the laminated film structure, the possible repetition number of recording and reproducing operation and the degree of corrosion caused by the sulfurization of the metal semi-transparent layer reflection film 70 occurred in an environmental test were evaluated. The overwrite number at which C/N was reduced by 3 dB when the record marks having a length of 1.1 μm were repeatedly overwritten at a line speed of 6.6 m/sec was defined as the possible repetition number of recording and reproducing operation.

The condition of the environmental test was assumed to be 85° C., 90% and 500 hours. The region where the sulfurization is occurred has a color different from a normal region. Thus, the existence of the sulfurization can be evaluated megascopically or by a microscope inspection.

The discharging when the film of the second dielectric layer 6 was formed was monitored from the reflection wave in the film formation. When the phenomenon that the reflection wave was instantly enlarged was observed, it was judged that the abnormal discharge was occurred. The difference of the specific resistance caused by the difference of the target composition was also examined at the same time. The medium constituted by the ZnS—SiO$_2$ that is used in some related techniques for the second dielectric layer 6 was evaluated as a reference at the same time.

Hereafter, the film composition of the second dielectric layer 6, the possible repetition number of recording and reproducing operation (written as "repeat count of O/W" below), the observing result of the existence of the corrosion, and the specific resistance of the target material were indicated.

FIG. 4 shows relative proportions of NbO$_x$ (P mol %)—ZnS (Q mol %)—Ta$_2$O$_5$ (R mol %) used as the second dielectric layer 6 and test results thereof. The FIG. 4 also shows the result of the medium in which the ZnS—SiO$_2$ is used as the second dielectric layer 6.

In the place where the NbO$_x$ is 50 mol %, when the ZnS is between 10 mol % and 30 mol % and the remainder is made of Ta$_2$O$_5$, it can be understood from FIG. 4 that the medium with the excellent recording and reproducing durability and without any corrosion can be obtained. On the other hand, when the ZnS is 5 mol %, the recording and reproducing durability is deteriorated. Also, when the rate of ZnS is 35 mol % or greater, the increase in the content of the sulfur component (S component) included in the ZnS involves the deterioration in the recording and reproducing durability and the increase in the specific resistance of the target. Thus, the discharging based on the pulse DC sputtering method becomes difficult. Then, the film formation based on the RF sputtering method was performed. When the ZnS—SiO$_2$ was used as a reference, similarly to No. 7 and No. 8, the RF sputtering was executed. Thus, the abnormal discharging was observed, and the recording and reproducing durability was poor, and the occurrence of the corrosion was observed. As a result, in the case that the NbO$_x$ was 50 mol %, it can be understood that the composition of the ZnS in which the recording and reproducing durability is excellent and the corrosion caused by the sulfurization and the abnormal discharging are not found out is in the range between 10 mol % and 30 mol %.

Next, FIG. 5 shows relative proportions of NbO$_x$ (P mol %)—ZnS (Q mol %)—Al$_2$O$_3$ (R mol %) used as the second dielectric layer 6 and test results thereof. Even in the case that the NbO$_x$ is 60 mol %, when the ZnS is between 10 mol % and 30 mol % and the remainder is made of the Al$_2$O$_3$, it can be understood that the medium with the excellent recording and reproducing durability and without any corrosion and abnormal discharging is obtained. Also, as compared with the media No. 7 and No. 8, the Al$_2$O$_3$ of 5 mol % is added to the medium of No. 7. This addition of the Al$_2$O$_3$ exhibits the effect of making the crystallizing speed of the record film faster. Thus, it is proved that with the combined effect of the ZnS rate, the recording and reproducing durability is improved as compared with the medium which does not include the Al$_3$O$_3$. It is also proved that the similar effect is obtained even in the third various oxides disclosed in this implementation as well as the Al$_2$O$_3$.

Next, FIG. 6 shows relative proportions of NbO$_x$ (P mol %)—ZnS (Q mol %)—Al$_2$O$_3$ (R mol %) used as the second dielectric layer 6 and test results thereof. In this case, the rate of ZnS is fixed to 20 mol %, the NbO$_x$ was changed in the range between 40 mol % and 78 mol %, and the remainder is made of the Al$_2$O$_3$ was examined. It can be understood that the medium with the excellent repetition recording reproducing durability and without any corrosion and abnormal discharging is obtained in the range of the NbO$_x$ between 50 mol % and 75 mol %. In the case that the NbO$_x$ is 45 mol % or less, the specific resistance of the target is 1Ω·cm or more and the abnormal discharging is generated, so that the stability of the film formation becomes insufficient. Also, when the NbO$_x$ exceeds 75 mol %, the deterioration in the recording and reproducing durability is started, which is not desirable.

Next, FIG. 7 shows relative proportions of NbO$_x$ (P mol %)—ZnS (Q mol %)—{(Al$_2$O$_3$)$_y$—(Ta$_2$O$_5$)$_{(1-y)}$} (R mol %) used as the second dielectric layer 6 and test results thereof. This implementation is described with regard to the case when the value of y is assumed to be 0.5. When the NbO$_x$ is 55 mol % and the ZnS is changed in the range between 5 mol % and 40 mol %, it can be understood that the medium with the excellent recording and reproducing durability and without any corrosion can be obtained in the range of the rate of ZnS between 10 mol % and 30 mol %. When the ZnS is 5 mol % or less, in association with the drop of the rate of ZnS, the hardness of the film is increased, which reduces the adhesion to the adjacent film and results in the deterioration in the recording and reproducing durability. Also, when the rate of ZnS is 35 mol % or more, the sulfur constituent included in the film is increased, and the sulfur constituent is shifted to the recording film side when recording and reproducing are repeatedly executed, and the recording and reproducing durability is deteriorated. Moreover, the specific resistance of the target exceeds 1 Ω·cm. Thus, the film formation through the RF sputtering method is required. Then, the abnormal discharging is likely to occur, which leads to the lack of mass productivity. Further, the inventor proved the fact that the similar effects can be obtained even in other various oxides disclosed in this implementation as well as those indicated in FIGS. 4 to 7.

Figure 8:
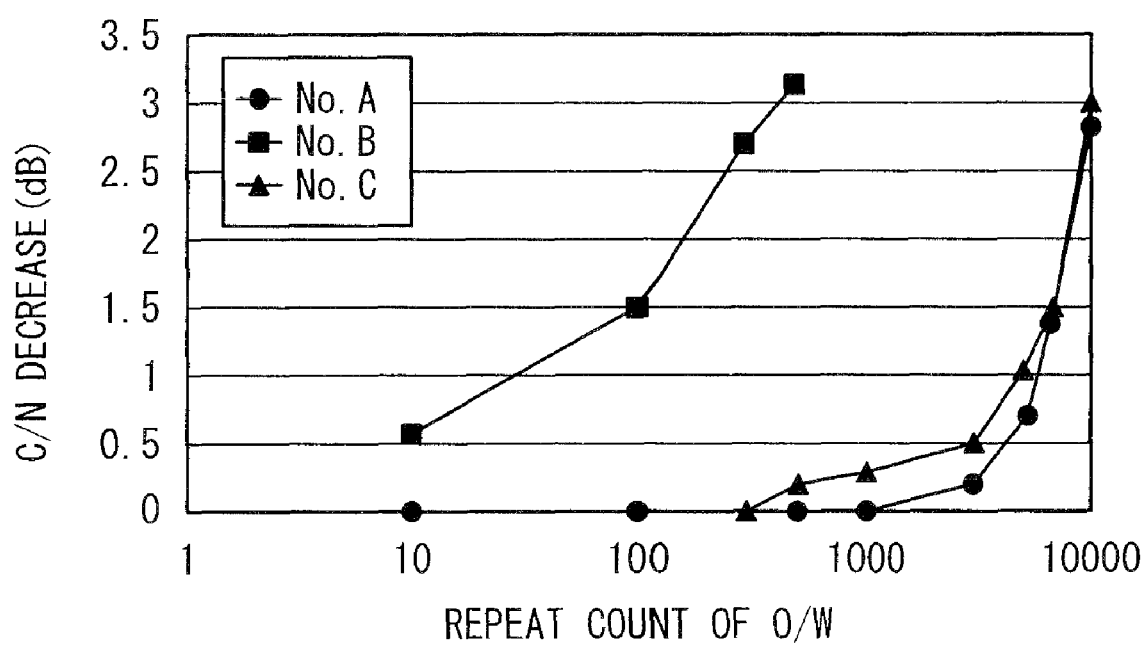
FIG. 8 is a view comparing a repetition recording and reproducing durability of each medium in a first embodiment of the present invention.

FIG. 8 shows the recording and reproducing durability of each of the media in which the dielectric substances in this implementation and reference examples are used. Here, each of the media of this implementation and the reference examples has the configuration shown in FIG. 1. In the medium in this implementation, $NbO_x$ (60 mol %)—ZnS (20 mol %)—$Al_2O_3$ (20 mol %) is used as the material of the second dielectric layer 6, as mentioned above as an example. In the medium in the first reference example, the ZnS—$SiO_2$ is used as the second dielectric layer 6. In the medium in the second reference example, the ZnS—$SiO_2$ is used as the second dielectric layer 6, and the barrier layer made of the GeN is inserted between the second dielectric layer 6 and the metal reflection layer 7.

A polygonal line No. A represents the case of this implementation, and the C/N drop amount after the 10000 repetition recording reproducing operations is 2.8 dB at most. A polygonal line No. B represents the case of the first reference example, and the C/N amount is dropped by 3 dB after the 500 repetition recording reproducing operations. A polygonal line No. C represents the case of the second reference example, and indicates the recording and reproducing durability substantially similar to that of this implementation. From this graph, it can be understood that by using the electrically conductive oxide in which less ZnS is included as disclosed in this implementation, a medium with an excellent recording and reproducing durability and without any corrosion and abnormal discharging and having a good mass productivity can be manufactured.

For a purpose of a reference, FIG. 9 shows a comparison between the film formation speed when the $NbO_x$ (60 mol %)—ZnS (20 mol %)—$Al_2O_3$ (20 mol %) of the film composition of an example disclosed in this implementation is pulse-DC-sputtered and the film formation speed when a reference example of ZnS-$SiO_2$ film is RF-sputtered. From FIG. 9, the film formation speed when the $NbO_x$ (60 mol %)—ZnS (20 mol %)—$Al_2O_3$ (20 mol) formed by the pulse DC sputtering method is similar to the film formation speed of the reference example of ZnS—$SiO_2$ film. Thus, from the viewpoint of the fact that the foregoing abnormal discharging does not occur in the film formation process, it can be understood that the pulse DC sputtering method is suitable for a mass production process.

(Second Implementation)

A second implementation according to a second embodiment of a present invention will be described below.

As shown in FIG. 2, the optical disc according to this embodiment includes the first transparent substrate 1. The first dielectric layer 2, the first interface layer 3, the recording layer 4, the second interface layer 5, the second dielectric layer 6, the metal semi-transparent layer 70 and the third dielectric layer 8 are sequentially laminated in this order, on this first transparent substrate 1. These layers are totally referred to as the first information layer 50. Then, the optical separation layer 21 is formed on this first information layer 50. Moreover, the second information layer 51 is arranged thereon. As for the second information layer 51, similarly to the first information layer 50, the metal reflection layer 12, the fourth dielectric layer 13, the third interface layer 14, the second recording layer 15, the fourth interface layer 16 and the fifth dielectric layer 17 are sequentially laminated in this order on the second transparent substrate 11. The first information layer 50 and the second information layer 51 are laminated on the transparent substrates different to each other. Finally, the respective dielectric layers of the first information layer and the second information layer are stuck through the optical separation layer 21 made of the ultraviolet light curing resin to each other. In this way, the optical information recording medium having the two information layers is manufactured. In the optical information recording medium manufactured by this method, the laser light used to record or reproduce information is inputted from the first information layer side. Hence, as mentioned above, this is the type A of the optical information recording medium.

In the explanation of this implementation, the case when only the first information layer is formed and a dummy substrate is stuck to the first information layer is explained. The second information layer is such that the medium configuration described in a first implementation is simply laminated in the opposite direction. Then, the material selection based on a first implementation is also appropriate in the case of the second information layer.

In the first information layer, a ZnS—$SiO_2$ film having a thickness of 50 nm was formed as the first dielectric layer, GeSbTe film having a thickness of 7 nm was formed as the recording layer 4, GeN film having a thickness of 3 nm was formed as each of the first interface layer 3 and the second interface layer 4, and an AgPdCu film having a thickness of 10 nm was formed as the metal reflection layer 7.

FIG. 10 shows relative proportions when $NbO_x$ (P mol %)—ZnS (Q mol %)—$Al_2O_3$ (R mol) was used as the second dielectric layer 6 and the third dielectric layer 8 and the test result thereof. FIG. 10 also shows the test result when the ZnS—$SiO_2$ of a reference example was used in the second dielectric layer 6 and the third dielectric layer 8 for a comparison.

As can be understood from FIG. 10, even if $NbO_x$ (P mol %)—ZnS (Q mol %)—$Al_2O_3$ (R mol) is used in the second dielectric layer 6 and the third dielectric layer 8 in the first information layer 50 of the two-layer medium, when the rate of $NbO_x$ is included in the range between 50 mol % and 75 mol %, the medium with the excellent recording and reproducing durability and without any corrosion and abnormal discharging is obtained.

The reason of the characteristics can be considered as follows. On one hand, when the content of the $NbO_x$ that is the oxide responsible for the conductive property is 50 mol % or less, the target specific resistance exceeds 1Ω·cm. Thus, the pulse DC sputtering method cannot be applied. So, the film formation is required to be executed by using the RF sputtering method. Thus, the abnormal discharging frequently occurs. On the other hand, in the composition in the range in which the rate of the $NbO_x$ exceeds 75 mol %, the content of the $NbO_x$ to the ZnS is relatively large, which leads to the lack of the flexibility of the film. Thus, the recording and reproducing durability of the medium is deteriorated.

That is, $NbO_x$ is the material to control the electric conductivity, and ZnS is the material to adjust the hardness of the film, and the various oxides disclosed in embodiments of the present invention as the third additional material is to adjust the recording and reproducing durability and the crystallizing speed of the recording film.

The inventor also proved that the similar effects can be achieved, when the various oxides disclosed in this embodiment are used as the second dielectric layer 6 and the third dielectric layer 8 other than the foregoing constituents The measurement results of the recording reproducing properties in the first and second implementations are obtained in the laser wavelength region between 380 nm and 430 nm.

In the above-mentioned embodiments and implementations, the optical disc of the so-called one-surface one-layer type or one-surface two-layer type for recording or reproducing the information by emitting the laser light from the surface on one side of the optical disc is explained. However, the dielectric layer, the information layer in which this dielectric layer is used, and the optical information recording medium, or the method that forms this dielectric layer by using the sputtering method, and the target used at that time according to the present invention are not limited to the use in the above-mentioned embodiments and implementations. That is, the present invention can be applied even to the so-called both-side type optical disc in which the laser lights are emitted to both surfaces of the optical disc, respectively, and the information can be recorded or reproduced, or the optical disc in which the information layers of 3 layers or more are laminated on one surface.

What is claimed is:

1. An optical information recording medium comprising:
   a recording layer on which information is recorded by changing an optical property of the recording layer by an irradiation of a laser light;
   a reflection layer configured to reflect the laser light; and
   an upper side dielectric layer configured to cover the recording layer from a side of the reflection layer,
   wherein the upper side dielectric layer contains niobium oxide and zinc sulfide,
   a mol ratio P of the niobium oxide to the upper side dielectric layer satisfies $50 \text{ mol }\% \leq P \leq 75 \text{ mol }\%$, and
   a mol ratio Q of the zinc oxide to the upper side dielectric layer satisfied $10 \text{ mol }\% \leq Q \leq 30 \text{ mol }\%$.

2. The optical information recording medium according to claim 1, wherein the upper side dielectric layer further contains an additive being at least one of or a mixture of at least two of materials selected from the group consisting of an aluminum oxide, tantalum oxide, silicon oxide, cerium oxide, yttrium oxide, hafnium oxide and bismuth oxide, and
   a mol ratio R of the additive to the upper side dielectric layer satisfies a condition $P+Q+R \geq 99 \text{ mol }\%$.

3. The optical information recording medium according to claim 1, wherein the reflection layer contains Ag as a primary constituent, and
   the reflection layer and the upper side dielectric layer are adjacent to each other.

4. The optical information recording medium according to claim 1, wherein a wavelength of the laser light is between 380 nm and 430 nm.

5. An optical information recording medium comprising a plurality of optical information recording layers,
   wherein each of the plurality of optical information recording layers includes:
   a recording layer on which information is recorded by changing an optical property of the recording layer by an irradiation of a laser light;
   a reflecting or semitransparent layer configured to reflect the laser light or to be semitransparent to the laser light; and
   an upper side dielectric layer configured to cover the recording layer from a side of the reflecting or semi-transparent layer,
   wherein the upper side dielectric layer contains niobium oxide and zinc sulfide,
   a mol ratio P of the niobium oxide to the upper side dielectric layer satisfies $50 \text{ mol }\% \leq P \leq 75 \text{ mol }\%$, and
   a mol ratio Q of the zinc oxide to the upper side dielectric layer satisfied $10 \text{ mol }\% \leq Q \leq 30 \text{ mol }\%$.

6. The optical information recording medium according to claim 5, wherein the upper side dielectric layer further contains an additive being at least one of or a mixture of at least two of materials selected from the group consisting of an aluminum oxide, tantalum oxide, silicon oxide, cerium oxide, yttrium oxide, hafnium oxide and bismuth oxide, and
   a mol ratio R of the additive to the upper side dielectric layer satisfies a condition $P+Q+R \geq 99 \text{ mol }\%$.

7. The optical information recording medium according to claim 5, wherein the reflecting or semitransparent layer is a reflection layer configured to reflect the laser light,
   the reflecting layer contains Ag as a primary constituent, and
   the reflecting layer and the upper side dielectric layer are adjacent to each other.

8. The optical information recording medium according to claim 5, wherein the reflecting or semitransparent layer is a semitransparent layer configured to be transparent to the laser light,
   the semitransparent layer contains Ag as a primary constituent, and
   the semitransparent layer and the upper side dielectric layer are adjacent to each other.

9. The optical information recording medium according to claim 1, wherein a wavelength of the laser light is between 380 nm and 430 nm.

10. An optical information recording layer comprising:
    a recording layer on which information is recorded by changing an optical property of the recording layer by an irradiation of a laser light;
    a reflecting or semitransparent layer configured to reflect the laser light or to be semitransparent to the laser light; and
    an upper side dielectric layer configured to cover the recording layer from a side of the reflecting or semi-transparent layer,
    wherein the upper side dielectric layer contains niobium oxide and zinc sulfide,
    a mol ratio P of the niobium oxide to the upper side dielectric layer satisfies $50 \text{ mol }\% \leq P \leq 75 \text{ mol }\%$, and
    a mol ratio Q of the zinc oxide to the upper side dielectric layer satisfied $10 \text{ mol }\% \leq Q \leq 30 \text{ mol }\%$.

11. The optical information recording layer according to claim 10, wherein the upper side dielectric layer further contains an additive being at least one of or a mixture of at least two of materials selected from the group consisting of an aluminum oxide, tantalum oxide, silicon oxide, cerium oxide, yttrium oxide, hafnium oxide and bismuth oxide, and
    a mol ratio R of the additive to the upper side dielectric layer satisfies a condition $P+Q+R \geq 99 \text{ mol }\%$.

12. The optical information recording layer according to claim 10, wherein the reflecting or semitransparent layer contains Ag as a primary constituent, and
    the reflecting or semitransparent layer and the upper side dielectric layer are adjacent to each other.

13. A dielectric material comprising:
    a niobium oxide; and
    a zinc sulfide,
    wherein a mol ratio P of the niobium oxide satisfies $50 \text{ mol }\% \leq P \leq 75 \text{ mol }\%$, and
    a mol ratio Q of the zinc oxide satisfied $10 \text{ mol }\% \leq Q \leq 30 \text{ mol }\%$.

14. The dielectric material according to claim 13, further comprising an additive,
    wherein the additive is at least one of or a mixture of at least two of materials selected from the group consisting of an aluminum oxide, tantalum oxide, silicon oxide, cerium oxide, yttrium oxide, hafnium oxide and bismuth oxide, and
    a mol ratio R of the additive satisfies a condition $P+Q+R \geq 99 \text{ mol }\%$.

15. A target used in a sputtering to form a dielectric film, comprising:

a niobium oxide; and a zinc sulfide, wherein a mol ratio P of the niobium oxide satisfies 50 mol %≦P≦75 mol %, and a mol ratio Q of the zinc oxide satisfied 10 mol %≦Q≦30 mol %.

16. The target according to claim 15, further comprising an additive, wherein the additive is at least one of or a mixture of at least two of materials selected from the group consisting of an aluminum oxide, tantalum oxide, silicon oxide, cerium oxide, yttrium oxide, hafnium oxide and bismuth oxide, and a mol ratio R of the additive satisfies a condition P+Q+R≧99 mol %.

17. The target according to claim 15, wherein a specific resistance of the target is equal to or less than 1 Ωcm.

* * * * *